(12) United States Patent
Kitade et al.

(10) Patent No.: US 11,467,040 B2
(45) Date of Patent: Oct. 11, 2022

(54) HEAT AMOUNT MEASURING METHOD AND HEAT AMOUNT MEASURING APPARATUS

(71) Applicant: Panasonic Intellectual Property Management Co., Ltd., Osaka (JP)

(72) Inventors: Naoya Kitade, Osaka (JP); Makoto Iyoda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 341 days.

(21) Appl. No.: 16/534,176

(22) Filed: Aug. 7, 2019

(65) Prior Publication Data
US 2020/0049570 A1 Feb. 13, 2020

(30) Foreign Application Priority Data

Aug. 8, 2018 (JP) .............................. JP2018-148962

(51) Int. Cl.
*G01K 7/00* (2006.01)
*G01K 7/02* (2021.01)
*G01K 17/06* (2006.01)

(52) U.S. Cl.
CPC ............. *G01K 7/021* (2013.01); *G01K 17/06* (2013.01)

(58) Field of Classification Search
CPC combination set(s) only.
See application file for complete search history.

(56) References Cited

U.S. PATENT DOCUMENTS 5,931,580 A * 8/1999 Wyland .................... G01K 7/01
374/166

FOREIGN PATENT DOCUMENTS

| CN | 103137577 A | * | 6/2013 | ............. H01L 35/32 |
|----|----|----|----|----|
| JP | 2002014065 A | * | 1/2002 | ............. G01N 25/20 |
| JP | 2009-222543 | | 10/2009 | |
| JP | 2013-228300 | | 11/2013 | |
| JP | 5917267 B2 | * | 5/2016 | |
| WO | WO-2015185204 A1 | * | 12/2015 | ............. H01L 23/38 |

OTHER PUBLICATIONS

EPO Translation of JP5917267 (Year: 2016).*

* cited by examiner

*Primary Examiner* — Lisa M Caputo
*Assistant Examiner* — Nasir U. Ahmed
(74) *Attorney, Agent, or Firm* — Wenderoth, Lind & Ponack, L.L.P.

(57) ABSTRACT

A heat amount measuring method includes a first step of providing a heat-transferring component that transfers and receives heat to and from a heating component and measuring, while the heating component is generating heat, a first heat amount of heat transmitted from the heating component to the heat-transferring component, a first heating component temperature, and a first substrate temperature, a second step of changing an output of the heat-transferring component and measuring a second heat amount of heat transmitted from the heating component to the heat-transferring component, a second heating component temperature, and a second substrate temperature, and a third step of calculating a heat amount of heat transmitted from the heating component to a substrate by using the first heat amount, the first heating component temperature, the first substrate temperature, the second heat amount, the second heating component temperature, and the second substrate temperature.

18 Claims, 6 Drawing Sheets

HEAT AMOUNT MEASURING METHOD AND HEAT AMOUNT MEASURING APPARATUS

BACKGROUND

1. Technical Field

The present disclosure relates to a heat amount measuring method and a heat amount measuring apparatus for a heating component mounted on a substrate.

2. Description of the Related Art

PTL 1 (Unexamined Japanese Patent Publication No. 2013-228300) discloses a heat amount detecting method that can detect a heat amount of a heating component mounted on a substrate.

SUMMARY

The present disclosure provides a heat amount measuring method and a heat amount measuring apparatus that can more accurately measure a heat amount of heat transmitted from a heating component mounted on a substrate to the substrate.

A heat amount measuring method according to the present disclosure is a heat amount measuring method of measuring a heat amount of a heating component mounted on a substrate. The method includes a first step of providing a heat-transferring component that transfers and receives heat to and from the heating component and measuring, while the heating component is generating heat, a first heat amount of heat transmitted from the heating component to the heat-transferring component, a first heating component temperature of the heating component, and a first substrate temperature of the substrate, a second step of changing an output of the heat-transferring component and measuring, while the heating component is generating heat, a second heat amount of heat transmitted from the heating component to the heat-transferring component, a second heating component temperature of the heating component, and a second substrate temperature of the substrate, and a third step of calculating a heat amount of heat transmitted from the heating component to the substrate by using the first heat amount, the first heating component temperature, the first substrate temperature, the second heat amount, the second heating component temperature, and the second substrate temperature.

A heat amount measuring apparatus according to the present disclosure is a heat amount measuring apparatus for measuring a heat amount of a heating component mounted on a substrate. The apparatus includes a controller, a computing unit, and a heat-transferring component that transfers and receives heat to and from the heating component. The controller measures a first heat amount of heat transmitted from the heating component to the heat-transferring component, a first heating component temperature of the heating component, and a first substrate temperature of the substrate, while the heating component is generating heat, and measures a second heat amount of heat transmitted from the heating component to the heat-transferring component, a second heating component temperature of the heating component, and a second substrate temperature of the substrate, while the heating component is generating heat after the controller changes an output of the heat-transferring component. The computing unit calculates a heat amount of heat transmitted from the heating component to the substrate by using the first heat amount, the first heating component temperature, the first substrate temperature, the second heat amount, the second heating component temperature, and the second substrate temperature.

The heat amount measuring method and the heat amount measuring apparatus according to the present disclosure can more accurately measure a heat amount of heat transmitted from a heating component mounted on a substrate to a substrate.

DETAILED DESCRIPTION

Exemplary embodiments will be described in detail below with reference to the accompanying drawings as appropriate. However, a description more detailed than necessary is sometimes omitted. For example, a detailed description of a well-known matter and a duplicated description of substantially the same configuration are omitted in some cases. This is to avoid unnecessary redundancy in the description below and to make the description easily understandable to those skilled in the art.

Note that the accompanying drawings and the following description are provided for those skilled in the art to fully understand the present disclosure, and are not intended to limit the subject matter as described in the appended claims.

First Exemplary Embodiment

The first exemplary embodiment will be described below with reference to FIGS. 1 to 5.

[1-1. Configuration]

Figure 1:
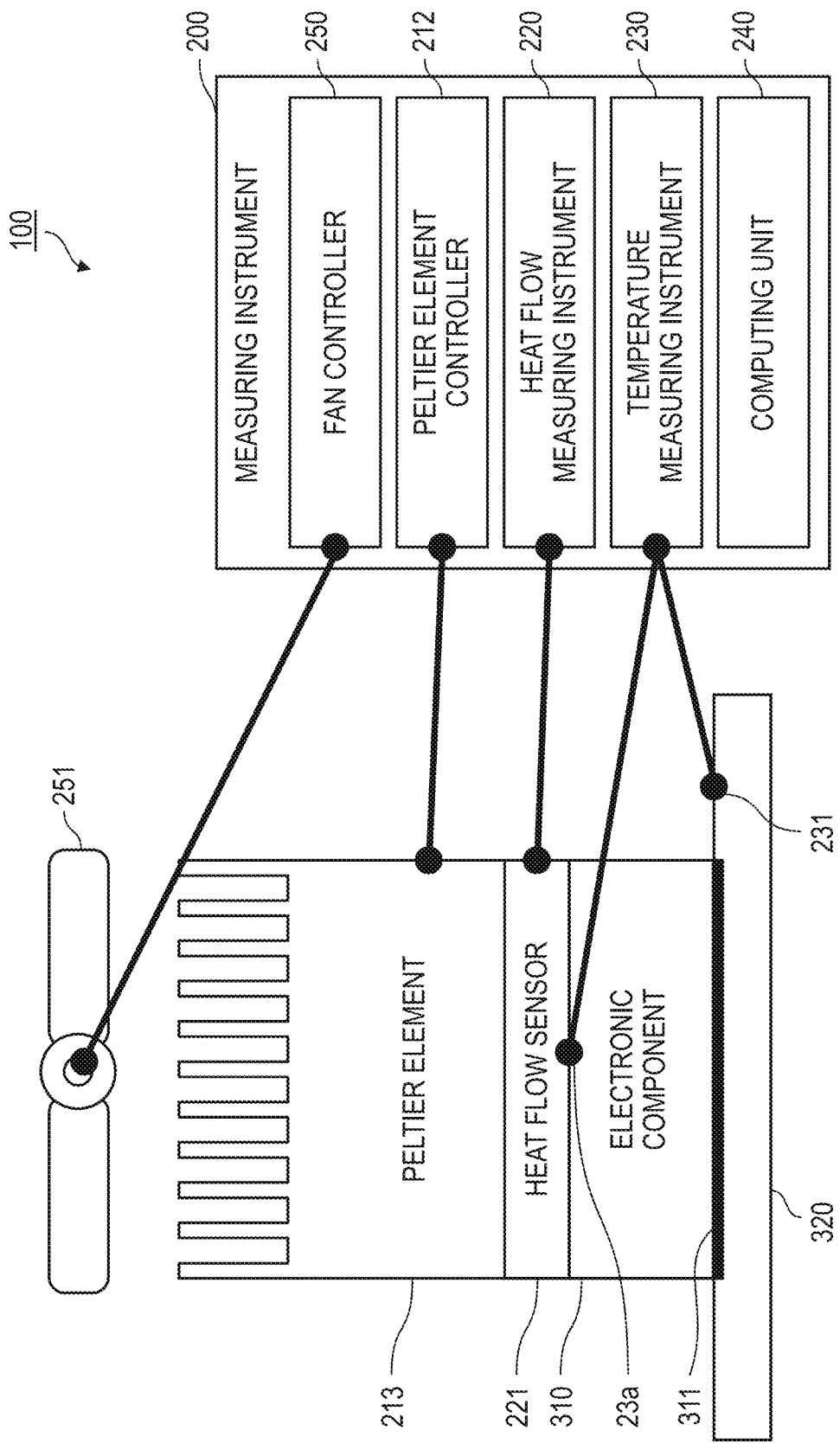
FIG. 1 is a schematic view showing heat amount measuring apparatus 100 according to a first exemplary embodiment.

FIG. 1 is a schematic view showing heat amount measuring apparatus 100 according to the first exemplary embodiment. Heat amount measuring apparatus 100 includes measuring instrument 200, Peltier element 213, fan 251, heat flow sensor 221, thermocouple 23a, and thermocouple 231.

Measuring instrument 200 includes Peltier element controller 212, fan controller 250, heat flow measuring instrument 220, temperature measuring instrument 230, and computing unit 240. Heat flow measuring instrument 220, temperature measuring instrument 230, Peltier element controller 212, and fan controller 250 will be generically referred to as controllers.

Peltier element controller 212 is connected to Peltier element 213. Peltier element 213 is a heat absorbing device. More specifically, Peltier element 213 causes heat absorption at one surface and heat generation at the other surface by using electric energy. This exemplary embodiment is configured to cause heat absorption at the surface located on a side of electronic component 310. Peltier element 213 is connected to a power supply. The user can cause Peltier element 213 to absorb a desired heat amount by operating Peltier element controller 212.

Fan controller 250 is connected to fan 251. Fan 251 is a cooling device. More specifically, fan 251 rotates using electric energy to generate an air flow for air cooling. Fan 251 is connected to a power supply. The user can cause fan 251 to absorb a desired heat amount by operating fan controller 250.

Heat flow measuring instrument 220 is connected to heat flow sensor 221. Heat flow sensor 221 is a device for measuring a heat amount flowing into heat flow sensor 221. More specifically, heat flow sensor 221 is a converter that generates an electrical signal proportional to a total heat amount applied to a surface of the sensor. Heat flow measuring instrument 220 receives the electrical signal generated by heat flow sensor 221 and quantifies a heat amount.

Temperature measuring instrument 230 is connected to thermocouple 23a and thermocouple 231. Although in this exemplary embodiment, temperature measuring instrument 230 is connected to the two thermocouples, i.e., thermocouple 23a and thermocouple 231, temperature measuring instrument 230 may be connected to three or more thermocouples. Temperature measuring instrument 230 quantifies a temperature of an object with which thermocouple 23a or thermocouple 231 comes into contact.

Computing unit 240 performs computation by using a heat amount quantified by heat flow measuring instrument 220, a temperature quantified by temperature measuring instrument 230, and other numerical values.

Electronic component 310 is a heating component. Electronic component 310 is mounted on a mounting surface 311 of substrate 320. Substrate 320 may be a ridge substrate (hard substrate) or flexible substrate. When a current flows in electronic component 310, electronic component 310 generates heat. Heat amount measuring apparatus 100 according to this exemplary embodiment measures a heat amount of heat transmitted from electronic component 310 to substrate 320 and measures a heat amount of electronic component 310.

[1-2. Operation]

An operation of heat amount measuring apparatus 100 having the above configuration will be described below. Heat amount measuring apparatus 100 calculates a thermal resistance between electronic component 310 and substrate 320, and measures a heat amount of electronic component 310.

[1-2-1. Measurement of Qa, Ta, and T1]

Figure 2:
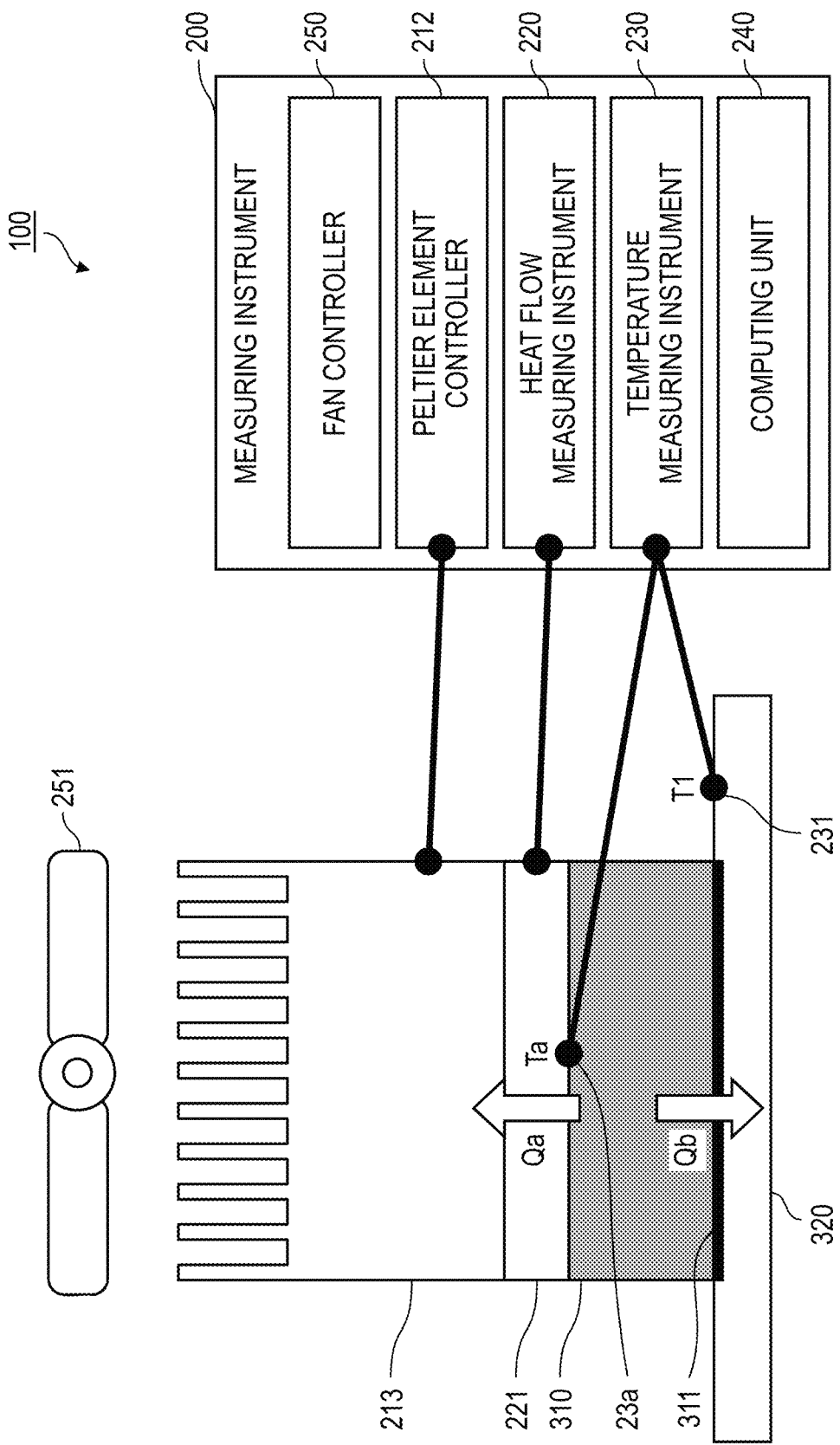
FIG. 2 is a schematic view showing how heat amount measuring apparatus 100 according to the first exemplary embodiment measures heat transfer amount Qa of heat transmitted from electronic component 310 to Peltier element 213, temperature Ta of electronic component 310, and temperature T1 of substrate 320, while electronic component 310 is generating heat.

FIG. 2 is a schematic view showing how heat amount measuring apparatus 100 according to the first exemplary embodiment measures heat transfer amount Qa of heat transmitted from electronic component 310 to Peltier element 213, temperature Ta of electronic component 310, and temperature T1 of substrate 320, while electronic component 310 is generating heat.

A definition of thermal resistance will be described first. Thermal resistance Rxy between point x and point y is defined by equation (1), where Tx is a temperature at point x, Ty is a temperature at point y, and Q is a heat transfer amount.

$$Rxy = \frac{|Tx - Ty|}{Q} \qquad \text{[Math 1]}$$

A heat transfer amount is a heat amount per unit time. When Peltier element 213 is operated while electronic component 310 is generating heat, the heat flows from electronic component 310 into Peltier element 213 through heat flow sensor 221. In this case, a heat amount flowing from electronic component 310 into Peltier element 213 per unit time is defined as heat transfer amount Qa.

Heat flow sensor 221 can measure heat transfer amount Qa. Thermocouple 23a can measure temperature Ta of electronic component 310. Thermocouple 231 can measure temperature T1 of substrate 320.

Accordingly, it is possible to measure heat transfer amount Qa, temperature Ta, and temperature T1.

Letting R1 be a thermal resistance between a measurement point of temperature Ta and a measurement point of temperature T1 and Qb be a heat transfer amount of heat transmitted from electronic component 310 to substrate 320, the following equation is obtained by using temperature Ta and temperature T1 according to (Math 1).

$$R1 = \frac{|Ta - T1|}{Qb} \qquad \text{[Math 2]}$$

Heat amount Q of electronic component 310 is expressed by [Math 3]

$$Q = Qa + Qb$$

Accordingly, (Math 2) and (Math 3) yield $$Q = Qa + \frac{|Ta - T1|}{R1}. \qquad \text{[Math 4]}$$

[1-2-2. Measurement of Qa', Ta', and T1']

While electronic component 310 is generating heat, the user changes an output of Peltier element 213 by operating Peltier element controller 212. This may change a heat transfer amount of heat transmitted from electronic component 310 to Peltier element 213, a temperature of electronic component 310, and a temperature of substrate 320. The resultant heat transfer amount and temperatures will be respectively denoted by Qa', Ta', and T1'.

Performing measurement in the same manner as in [1-2-1. Measurement of Qa, Ta, and T1] will yield the following equation:

$$Q = Qa' + \frac{|Ta' - T1'|}{R1}. \qquad \text{[Math 5]}$$

[1-2-3. Measuring Method]

Figure 3:
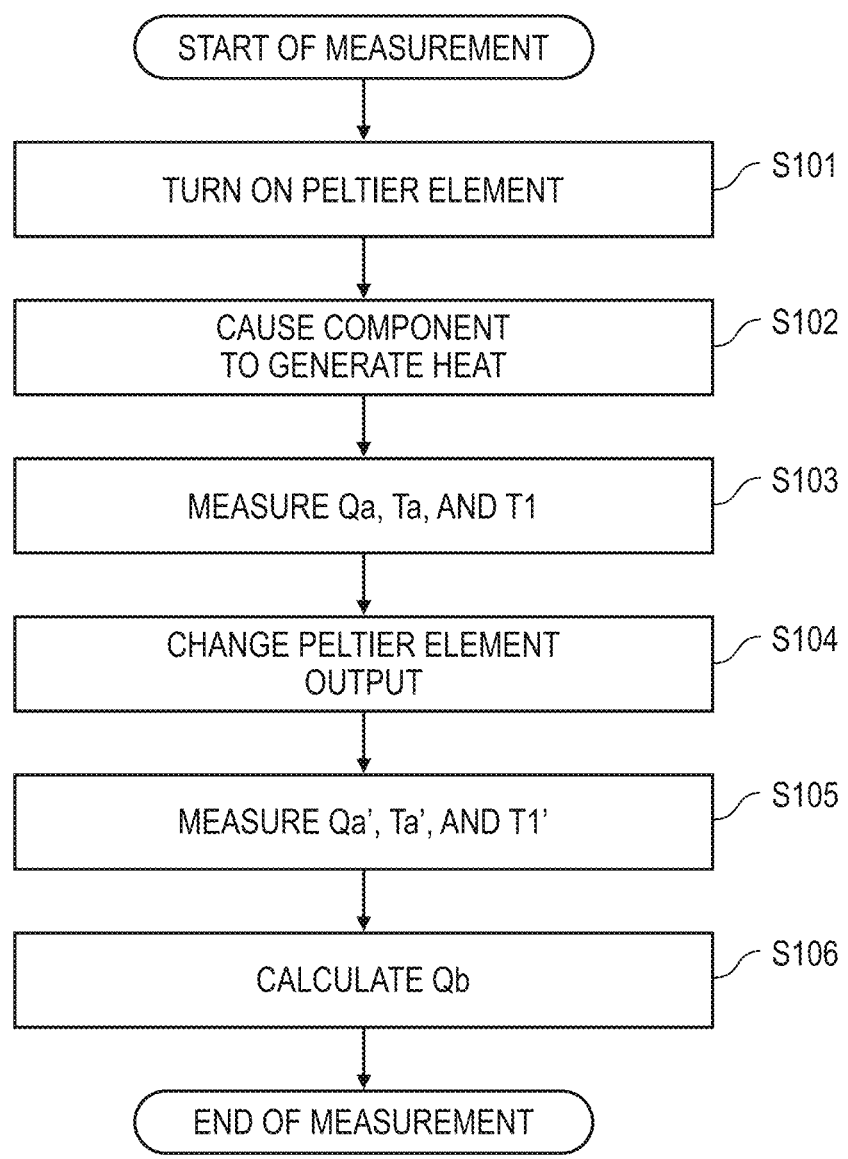
FIG. 3 is a flowchart for explaining an operation of heat amount measuring apparatus 100 according to the first exemplary embodiment when calculating heat transfer amount Qb as a heat amount of heat transmitted from electronic component 310 to substrate 320 per unit time.

FIG. 3 is a flowchart for explaining an operation of heat amount measuring apparatus 100 according to the first exemplary embodiment when calculating heat transfer amount Qb as a heat amount of heat transmitted from electronic component 310 to substrate 320 per unit time.

The user causes Peltier element 213 to operate by operating Peltier element controller 212 (S101). Peltier element controller 212 may cause Peltier element 213 to automatically operate. In this case, an output of Peltier element 213 may be set to 0. That is, Peltier element 213 may be turned off. Step S101 may be performed after step S102 (to be described later).

The user makes a current flow to electronic component 310 to cause electronic component 310 to generate heat (S102). A controller may be connected to electronic component 310 and automatically make a current flow to electronic component 310 to cause electronic component 310 to generate heat.

Heat flow sensor 221, thermocouple 23a, and thermocouple 231 respectively measure heat transfer amount Qa, temperature Ta, and temperature T1 (S103). As a result, (Math 4) is obtained.

The user changes an output of Peltier element 213 by operating Peltier element controller 212 (S104). Peltier element controller 212 may cause Peltier element 213 to automatically operate. In this case, the output of Peltier element 213 is set to differ from a setting in step S101. If the output of Peltier element 213 is set to differ from the setting in step S101, the output of Peltier element 213, i.e., Peltier element 213, may be turned off.

Heat flow sensor 221, thermocouple 23a, and thermocouple 231 respectively measure heat transfer amount Qa', temperature Ta', and temperature T1' (S105). As a result, (Math 4) is obtained.

Computing unit 240 calculates heat amount Q and thermal resistance R1 by using (Math 4) obtained in step S103 and (Math 5) obtained in step S105 (S106). As a result, heat transfer amount Qb can be calculated by using (Math 2) and (Math 3).

Note that heat transfer amount Qb' may be calculated, instead of heat transfer amount Qb, by using (Math 6).

$$R1 = \frac{|Ta' - T1'|}{Qb'} \quad \text{[Math 6]}$$

Heat amount Q may be calculated as a sum of heat transfer amount Qa and heat transfer amount Qb or a sum of heat transfer amount Qa' and heat transfer amount Qb'.

In step S103, a heat amount sensor disposed on a surface of electronic component 310 which faces neither substrate 320 nor Peltier element 213 may measure heat transfer amount Qc of heat transmitted from electronic component 310. Heat amount Q may be calculated as a sum of heat transfer amount Qa and heat transfer amount Qc or a sum of heat transfer amount Qa, heat transfer amount Qb, and heat transfer amount Qc.

In step S105, a heat amount sensor disposed on a surface of electronic component 310 which faces neither substrate 320 nor Peltier element 213 may measure heat transfer amount Qc' of heat transmitted from electronic component 310. Heat amount Q may be calculated as a sum of heat transfer amount Qa' and heat transfer amount Qc' or a sum of heat transfer amount Qa', heat transfer amount Qb', and heat transfer amount Qc'.

The flowchart in FIG. 3 is designed to perform each of the following steps once: step S104 of changing an output of Peltier element 213 and step S105 of measuring heat transfer amount Qa', temperature Ta', and temperature T1'. However, performing these steps a plurality of times will improve accuracy. More specifically, after step S105, the output of Peltier element 213 may be changed again in step S104, and heat transfer amount Qa", temperature Ta", and Temperature T1" may be measured again in step S105. In addition, step S104 and step S105 may be performed an arbitrary number of times. In finally calculating a desired heat transfer amount (for example, heat transfer amount Qb), a final result may be calculated by least-square method using a result of measurement in step S103 and results of a plurality of times of measurement in step S105.

According to the flowchart in FIG. 3, step S101 of causing Peltier element 213 to operate is performed before step S102 of causing electronic component 310 to generate heat. However, step S101 may be performed after step S102 of causing electronic component 310 to generate heat. That is, a sequence of steps becomes as follows: step S102, step S101, step S103, step S104, step S105, and step S106.

[1-2-4. Others]

Figure 4:
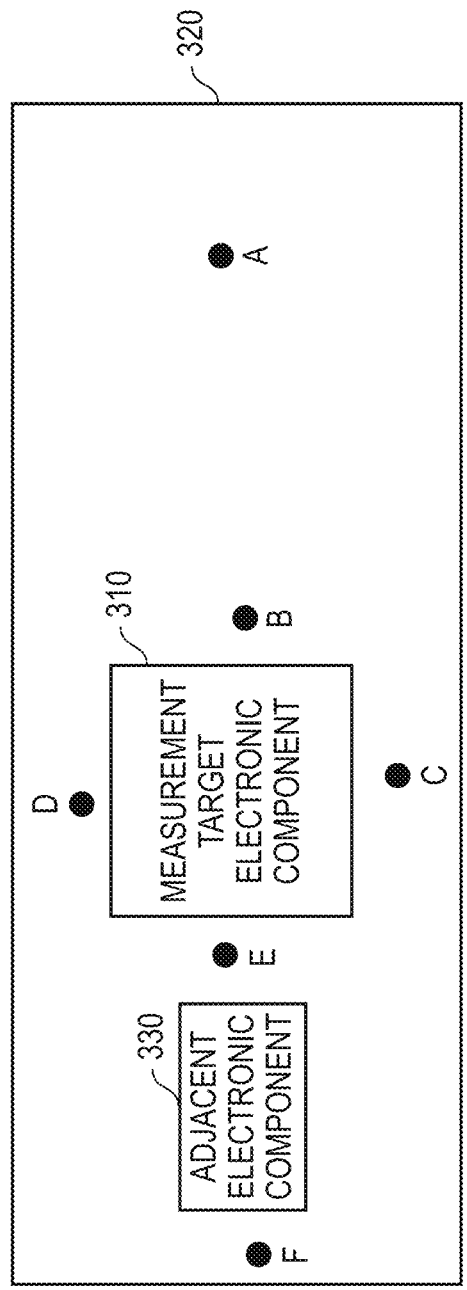
FIG. 4 is a view for explaining measurement points when thermocouple 231 measures a temperature of substrate 320.

FIG. 4 is a view for explaining measurement points when thermocouple 231 measures a temperature of substrate 320. Electronic component 310 that measures a heat amount and electronic component 330 adjacent to electronic component 310 are mounted on substrate 320. When a current flows in electronic component 330, electronic component 330 generates heat. Assume that in addition to electronic component 310 as a heat amount measurement target, another or other heating units (electronic component 330 in FIG. 5) exist. In this case, another heating unit is preferably located outside between electronic component 310 and a measurement point where thermocouple 231 measures a temperature of substrate 320 in terms of improving measurement accuracy. This is because another heating unit exerts less influence on measurement in a case in which another heating unit is located outside between electronic component 310 and a measurement point where thermocouple 231 measures a temperature of substrate 320 than on measurement in a case in which another heating unit is located between electronic component 310 and a measurement point where thermocouple 231 measures a temperature of substrate 320. More specifically, at point F in FIG. 4, another heating unit is located between electronic component 310 and a measurement point where thermocouple 231 measures a temperature of substrate 320. In contrast to this, at each of points A, B, C, D, and E in FIG. 4, another heating unit is located outside between electronic component 310 and a measurement point where thermocouple 231 measures a temperature of substrate 320. These points are therefore preferable as measurement points in terms of improving measurement accuracy.

[1-3. Effects and Others]

As described above, a heat amount measuring method according to this exemplary embodiment is a heat amount measuring method of measuring heat amount Q of electronic component 310 mounted on substrate 320. The method includes a first step of providing Peltier element 213 that transfers and receives heat to and from electronic component 310 and measuring, while electronic component 310 is generating heat, heat transfer amount Qa of heat transmitted from electronic component 310 to Peltier element 213, temperature Ta of electronic component 310, and temperature T1 of substrate 320, a second step of changing an output of Peltier element 213 and measuring, while electronic component 310 is generating heat, heat transfer amount Qa' of heat transmitted from electronic component 310 to Peltier element 213, temperature Ta' of electronic component 310, and temperature T1' of substrate 320, and a third step of calculating heat transfer amount Qb or heat transfer amount Qb' of heat transmitted from electronic component 310 to substrate 320 by using at least heat transfer amount Qa, temperature Ta, temperature T1, heat transfer amount Qa', temperature Ta', and temperature T1'.

Heat amount measuring apparatus 100 according to this exemplary embodiment is a heat amount measuring apparatus for measuring heat amount Q of electronic component 310 mounted on substrate 320. The apparatus includes a controller, computing unit 240, and Peltier element 213 that transfers and receives heat to and from electronic component 310. The controller measures heat transfer amount Qa of heat transmitted from electronic component 310 to Peltier element 213, temperature Ta of electronic component 310, and temperature T1 of substrate 320, while electronic component 310 is generating heat, changes an output of Peltier element 213, and measures heat transfer amount Qa' flowing out from electronic component 310 to Peltier element 213, temperature Ta' of electronic component 310, and temperature T1' of substrate 320, while electronic component 310 is generating heat. Computing unit 240 calculates heat transfer amount Qb or heat transfer amount Qb' of heat transmitted from electronic component 310 to substrate 320 by using at least heat transfer amount Qa, temperature Ta, temperature T1, heat transfer amount Qa', temperature Ta', and temperature T1'.

The method and apparatus described above can measure a heat amount of heat transmitted from a heating component mounted on a substrate to the substrate in spite of the fact that no heat flow sensor can be disposed between the heating component and the substrate. In addition, because it is not necessary to perform measurement without causing an electronic component to generate heat, it is not necessary to take the time to change a state in which the electronic component is generating no heat to a state in which the electronic component generates heat and becomes thermally stable. This makes it possible to perform measurement in a shorter time.

According to the heat amount measuring method of this exemplary embodiment, no heating unit is located between electronic component 310 and a measurement point of temperature T1, and no heating unit is located between electronic component 310 and a measurement point of temperature T1'.

This makes it possible to more accurately measure a heat amount of heat transmitted from a heating component mounted on a substrate to the substrate.

The heat amount measuring method according to this exemplary embodiment further includes further measuring heat transfer amount Qc as at least part of a heat amount of heat transmitted from a surface of electronic component 310 which faces neither substrate 320 nor Peltier element 213, while electronic component 310 is generating heat.

This makes it possible to also measure part of a heat amount of heat transmitted from a surface other than the surface facing the substrate in addition to a heat amount of heat transmitted from the heating component mounted on the substrate to the substrate.

The heat amount measuring method according to this exemplary embodiment is configured to calculate heat amount Q of electronic component 310 by using heat transfer amount Qb or heat transfer amount Qb' of heat transmitted from electronic component 310 to substrate 320 and at least one of heat transfer amount Qa, heat transfer amount Qa', and heat transfer amount Qc.

This makes it possible to more accurately measure a heat amount of a heating component mounted on a substrate. Measuring a heat amount of a heating component can calculate an overall heat amount of a product on which a heating component is mounted. This helps, for example, designing a heat dissipation function for the product.

In the heat amount measuring method according to this exemplary embodiment, Peltier element 213 is a heat absorbing device.

This makes it possible to more accurately measure a heat amount of heat transmitted from a heating component mounted on a substrate to the substrate.

In the heat amount measuring method according to this exemplary embodiment, thermocouple 231 measures temperature T1 and temperature T1'.

This can further accurately measure a temperature of a substrate.

Second Exemplary Embodiment

A second exemplary embodiment will be described below with reference to FIG. 5.

Figure 5:
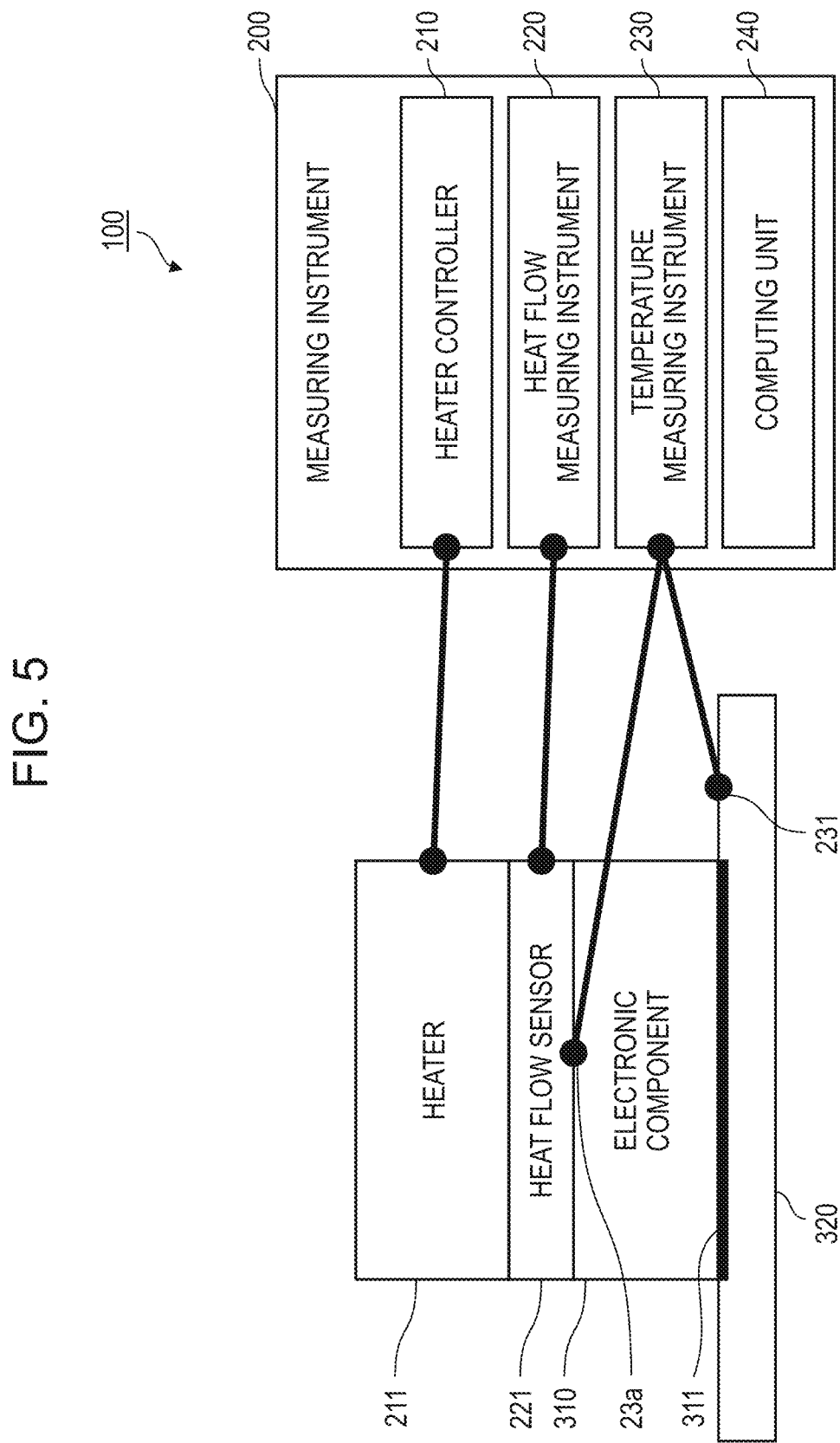
FIG. 5 is a schematic view showing heat amount measuring apparatus 100 according to a second exemplary embodiment.

FIG. 5 is a schematic view showing heat amount measuring apparatus 100 according to the second exemplary embodiment. Heater 211 may be used in place of Peltier element 213 of heat amount measuring apparatus 100 according to the first exemplary embodiment. Heater 211 is a heating element. Heater controller 210 for controlling heater 211 is used in place of Peltier element controller 212. When heater 211 is used in place of Peltier element 213, electronic component 310 sometimes absorbs heat from heater 211. In this case, heat transfer amount Qa as a heat absorption amount per unit time is handled as a negative value.

Note, however, that measurement accuracy is higher by using Peltier element 213 than by using heater 211. Using Peltier element 213 will increase heat transfer amount Qa but decrease heat transfer amount Qb. Using heater 211 will decrease heat transfer amount Qa but increase heat transfer amount Qb. In this case, because heat transfer amount Qa measured by heat flow sensor 221 is generally higher in accuracy than heat transfer amount Qb obtained by calculation, measurement accuracy is improved by using Peltier element 213, which increases heat transfer amount Qa.

As described above, the heat amount measuring method according to this exemplary embodiment uses heater 211 in place of Peltier element 213.

This makes it possible to measure a heat amount of heat transmitted from a heating component mounted on a substrate to the substrate without using any Peltier element.

Third Exemplary Embodiment

The third exemplary embodiment will be described below.

In the heat amount measuring method according to the first exemplary embodiment, temperature T1 and temperature T1' of substrate 320 are measured. However, a temperature of substrate 320 may be measured at a plurality of measurement points. For measurement at a plurality of points, heat amount measuring apparatus 100 may include thermocouples 232, 233, 234, . . . in addition to thermocouple 23a and thermocouple 231. Temperatures of substrate 320 which are measured at a plurality of points are denoted by T2, T2', T3, T3', T4, T4' . . . . A thermal resistance between electronic component 310 and measurement points of temperatures T1 and T1' of substrate 320 is denoted by R1, a thermal resistance between electronic component 310 and measurement points of temperatures T2 and T2' of substrate 320 is denoted by R2, a thermal resistance between electronic component 310 and measurement points of temperatures T3 and T3' of substrate 320 is denoted by R3, and ditto. Note that the measurement point of temperature T1 and the measurement point of temperature T1' are substantially the same, the measurement point of temperature T2 and the measurement point of temperature T2' are substantially the same, the measurement point of temperature T3 and the measurement point of temperature T3' are substantially the same, and ditto for temperatures T4 and T4' . . . . Solving simultaneous equations in the same manner as in the first exemplary embodiment will obtain R1, R2, R3 . . . .

As described above, the heat amount measuring method according to this exemplary embodiment is configured to measure temperatures T1 and T1' at a plurality of measurement points.

This makes it possible to more accurately measure a heat amount of heat transmitted from a heating component mounted on a substrate to the substrate.

Fourth Exemplary Embodiment

The fourth exemplary embodiment will be described below with reference to FIG. 6.

Figure 6:
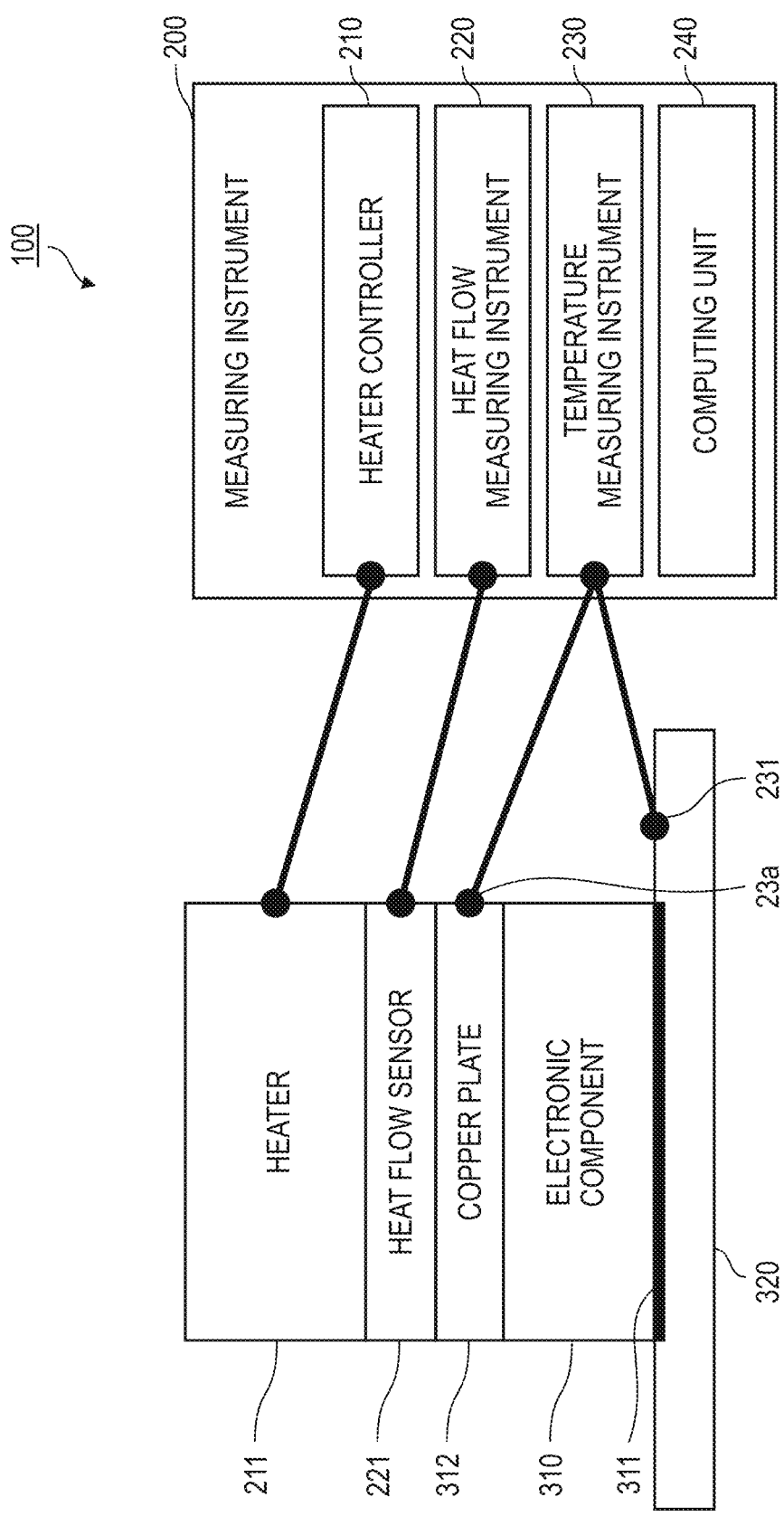
FIG. 6 is a schematic view showing heat amount measuring apparatus 100 according to a fourth exemplary embodiment.

FIG. 6 is a schematic view showing heat amount measuring apparatus 100 according to the fourth exemplary embodiment. In the heat amount measuring method according to the second exemplary embodiment, copper plate 312 may be brought into contact with electronic component 310, and temperatures of copper plate 312 may be regarded as temperatures Ta and Ta'. Bringing copper plate 312 into contact with electronic component 310 along its upper surface makes it possible to measure a value near an average temperature of the upper surface of electronic component 310. Note that any plate can be used in place of the copper plate. More specifically, it is preferable to use a thin plate containing, as a principal component, a material having high thermal conductivity, such as copper, aluminum, or graphite.

As described above, in the heat amount measuring method according to this exemplary embodiment, copper plate 312 is brought into contact with electronic component 310, and temperatures of copper plate 312 are regarded as temperatures Ta and Ta'.

This makes it possible to more accurately measure a temperature of a heating component.

Fifth Exemplary Embodiment

The fifth exemplary embodiment will be described below.

The heat amount measuring method according to the first exemplary embodiment may be configured to measure temperatures T1 and T1' with a non-contact thermometer.

As described above, the heat amount measuring method according to the first exemplary embodiment is configured to measure temperatures T1 and T1' with a non-contact thermometer This makes it possible to perform measurement without bring a thermocouple into contact with a substrate.

Other Exemplary Embodiments

The first to fifth exemplary embodiments each have been described above as an example of the technique disclosed in the present application. However, the technique in the present disclosure is not limited to these exemplary embodiments, and is also applicable to exemplary embodiments having undergone alterations, substitutions, additions, omissions, and the like. A new exemplary embodiment can also be made by combining the respective constituent elements described in the first to fifth exemplary embodiments.

Accordingly, other exemplary embodiments will be exemplarily described below.

Although the first to fifth exemplary embodiments use both Peltier element 213 and fan 251, either Peltier element 213 or fan 251 may not be used. When Peltier element 213 is not used, Peltier element controller 212 is not used either. When fan 251 is not used, fan controller 250 is not used either.

Although in the first to fifth exemplary embodiments, Peltier element 213 and heat flow sensor 221 are located above electronic component 310, Peltier element 213 and heat flow sensor 221 may be located on a side of electronic component 310. Even when Peltier element 213 and heat flow sensor 221 are located on a side of electronic component 310, heat flow sensor 221 is preferably located between Peltier element 213 and electronic component 310.

The above exemplary embodiments are provided to exemplify the technique in the present disclosure, and hence various alterations, substitutions, additions, omissions, and the like can be made within the scope of the claims or equivalents of the claims.

The present disclosure can be applied to a method of measuring a heat amount.

What is claimed is:

1. An amount measuring method of measuring a heat amount of a heating component mounted on a substrate, the method comprising:

a first step of providing a heat-transferring component including a Peltier element that transfers and receives heat to and from the heating component and measuring, while current flows to the heating component and the heating component generates heat, a first heat amount of heat transmitted from the heating component to the heat-transferring component, a first heating component temperature of the heating component, and a first substrate temperature of the substrate;

a second step of changing an output of the heat-transferring component and measuring, while current flows to the heating component and the heating component generates heat, a second heat amount of heat transmitted from the heating component to the heat-transferring component, a second heating component temperature of the heating component, and a second substrate temperature of the substrate; and a third step of calculating a heat amount of heat transmitted from the heating component to the substrate by using the first heat amount, the first heating component temperature, the first substrate temperature, the second heat amount, the second heating component temperature, and the second substrate temperature, wherein the first substrate temperature and the second substrate temperature are measured in the first step and the second step at a measurement point on the substrate that is a distance apart from the heating component.

2. The heat amount measuring method according to claim 1, wherein no heating unit is located between the heating component and a measurement point of the first substrate temperature, and no heating unit is located between the heating component and a measurement point of the second substrate temperature.

3. The heat amount measuring method according to claim 1, in the first step or the second step, further includes measuring a third heat amount as at least part of a heat amount of heat transmitted from a surface of the heating component which faces neither the substrate nor the heat-transferring component.

4. The heat amount measuring method according to claim 3, further comprising:
a step of calculating a heat amount of the heating component by using a heat amount of heat transmitted from the heating component to the substrate and at least one of the first heat amount, the second heat amount, and the third heat amount.

5. The heat amount measuring method according to claim 1, wherein the heat-transferring component is a heating device and a heat absorbing device.

6. The heat amount measuring method according to claim 1, wherein the first substrate temperature and the second substrate temperature each are measured at a plurality of measurement points.

7. The heat amount measuring method according to claim 1, wherein a temperature of a thin plate in contact with the heating component is regarded as the first heating component temperature or the second heating component temperature.

8. The heat amount measuring method according to claim 1, wherein the first heating component temperature, the second heating component temperature, the first substrate temperature, and the second substrate temperature are measured by a thermocouple thermometer.

9. The heat amount measuring method according to claim 1, wherein
the first heating component temperature and the second heating component temperature are measured by a thermocouple thermometer, and
the first substrate temperature and the second substrate temperature are measured by a non-contact thermometer.

10. A heat amount measuring apparatus for measuring a heat amount of a heating component mounted on a substrate, the apparatus comprising:
a controller;
a computing unit; and
a heat-transferring component including a Peltier element that transfers and receives heat to and from the heating component,
wherein
the controller
measures a first heat amount of heat transmitted from the heating component to the heat-transferring component, a first heating component temperature of the heating component, and a first substrate temperature of the substrate, while current flows to the heating component and the heating component generates heat, and
measures a second heat amount of heat transmitted from the heating component to the heat-transferring component, a second heating component temperature of the heating component, and a second substrate temperature of the substrate, while current flows to the heating component and the heating component generates heat after the controller changes an output of the heat-transferring component, and
the computing unit calculates a heat amount of heat transmitted from the heating component to the substrate by using the first heat amount, the first heating component temperature, the first substrate temperature, the second heat amount, the second heating component temperature, and the second substrate temperature,
wherein the controller measures the first substrate temperature and the second substrate temperatures at a measurement point on the substrate that is a distance apart from the heating component.

11. The heat amount measuring apparatus according to claim 10, wherein no heating unit is located between the heating component and a measurement point of the first substrate temperature, and no heating unit is located between the heating component and a measurement point of the second substrate temperature.

12. The heat amount measuring apparatus according to claim 10, wherein the controller further measures a third heat amount as at least part of a heat amount of heat transmitted from a surface of the heating component which faces neither the substrate nor the heat-transferring component, while the heating component is generating heat.

13. The heat amount measuring apparatus according to claim 12, wherein a heat amount of the heating component is calculated by using a heat amount of heat transmitted from the heating component to the substrate and at least one of the first heat amount, the second heat amount, and the third heat amount.

14. The heat amount measuring apparatus according to claim 10, wherein the heat-transferring component is a heating device and a heat absorbing device.

15. The heat amount measuring apparatus according to claim 10, wherein the controller measures each of the first substrate temperature and the second substrate temperature at a plurality of measurement points.

16. The heat amount measuring apparatus according to claim 10, further comprising:
a thin plate in contact with the heating component,
the controller measures a temperature of the thin plate as the first heating component temperature or the second heating component temperature.

17. The heat amount measuring apparatus according to claim 10, further comprising a thermocouple thermometer,
wherein the controller measures the first heating component temperature, the second heating component temperature, the first substrate temperature, and the second substrate temperature with a thermocouple thermometer.

18. The heat amount measuring apparatus according to claim 10, further comprising a thermocouple thermometer and a non-contact thermometer,
wherein the controller measures the first heating component temperature and the second heating component temperature with a thermocouple thermometer, and measures the first substrate temperature and the second substrate temperature with a non-contact thermometer.

* * * * *